United States Patent

[11] 3,568,835

| [72] | Inventor | Holger M. Hansen<br>Ann Arbor, Mich. |
| --- | --- | --- |
| [21] | Appl. No. | 741,401 |
| [22] | Filed | July 1, 1968 |
| [45] | Patented | Mar. 9, 1971 |
| [73] | Assignee | The International Marketing Corporation<br>Detroit, Mich. |

[54] LIQUID SEPARATOR AND FILTER UNIT
12 Claims, 9 Drawing Figs.

[52] U.S. Cl. .................................................. 210/86,
210/115, 210/119, 210/123
[51] Int. Cl. ...................................................... B01d 35/14
[50] Field of Search........................................... 210/73,
100, 114, 115, 119, 123, 86, 84

[56] References Cited
UNITED STATES PATENTS
| 2,009,649 | 7/1935 | Carlson ........................ | 210/123X |
| --- | --- | --- | --- |
| 2,047,229 | 7/1936 | Samiran ....................... | 210/115X |
| 2,381,760 | 8/1945 | Latham, Jr. .................. | 210/84X |
| 3,386,581 | 6/1968 | Gough.......................... | 210/123X |

*Primary Examiner*—John Adee
*Attorney*—Jacobs and Jacobs

ABSTRACT: An apparatus for separating water and other foreign material from a liquid such as diesel fuel and then filtering the fuel comprises a container having an inlet at its upper end for the liquid to be treated and means for subjecting the incoming liquid to the action of sufficient centrifugal force to separate water and heavier dirt particles from the fuel and cause the water and dirt particles to settle into the lower portion of the container. The fuel is then caused to flow upwardly through a valve to a final filter and is discharged from an outlet in the container. A float in the lower portion of the container has a density between that of water and the fuel and controls the opening and closing of the valve. As the float rises due to the accumulation of water in the bottom of the container the valve closes off the flow of fuel to the filter to prevent the delivery of contaminated fuel to the engine. The float also operates a warning signal to indicate the imminence of the closing of the valve, as well as an exit valve, previously opened, to provide a drain for the water and other materials which have been separated from the fuel.

INVENTOR
HOLGER M. HANSEN

BY Jacobs & Jacobs

ATTORNEYS

INVENTOR
HOLGER M. HANSEN

BY  Jacobs & Jacobs
ATTORNEYS

LIQUID SEPARATOR AND FILTER UNIT

The presence of water and dirt in diesel fuels can cause irregular operation of an engine and is also detrimental to many of the parts of an engine, particularly the fuel injectors and other precision-made parts. Many efforts have been made in the past to provide adequate filters for fuels of this type and to separate any water that may be present in such fuel before delivery of the fuel to the engine. There are commercially available filters which can effectively separate water and dirt from the fuel but these devices require frequent cleaning and/or replacement. Such involves a considerable expense as well as a removal of the vehicle involved from service during this operation. Efforts have thus continued to find a relatively maintenance free system for providing clean fuel to diesel engines.

The present invention provides a self-contained compact unit which effectively separates water and other foreign materials from diesel fuels and the passes the fuel through a final filter to the engine. The preliminary separation of water and other foreign material is obtained by subjecting the incoming fuel to centrifugal force so that the fuel that is passed into the final filter is relatively clean and in fact is clean enough so that a commercial type of filter may be used as a final filter for extensive periods of time without requiring cleaning or replacement. The combined separator and filter unit of this invention thus greatly prolongs the useful life of the filter portion of the unit with a great saving in maintenance costs as well as providing highly effective fuel filtering.

The apparatus of the present invention comprises a generally cylindrical container having fuel inlet and outlet means in its upper or top portion. A cleaning aperture either separate from or in combination with the inlet or outlet means such as by using a two-way valve is also provided. Within the upper portion of the container is a filter chamber which may contain one or more final filters. Discharge means is disposed in the lower portion of the container for elimination of the water and materials separated from the fuel.

Means for subjecting the fuel to centrifugal force as it passes downward within the container is provided such as by disposing helical baffles or vanes between the filter chamber and the inner portion of the container wall. Suitable valve means is provided so that the separated fuel then flows upward through the filter chamber and the final filter disposed therein before passing onward to the engine. Means for closing the valve as the water level in the lower portion of the container rises is provided so that separated water will not be fed to the engine.

A warning device is associated with said closure means so that if the water level rises in the lower portion of the container to a point where water might be close to passing upward into the filter chamber with the fuel, the vehicle operator will be warned of such a state and if desired the vehicle can automatically be shut down by complete fuel starvation by setting the closure means for complete valve closure upon operation of the warning device. It would normally be preferred to have controllable starvation rather than complete starvation i.e. a reduction in fuel flow rather than complete fuel cutoff.

It is generally preferred to form the filter chamber as an inner container which may have straight or flared sides and a flat or concave bottom. This inner container is suitable supported within the upper portion of the main container. A suitable aperture is constructed through the bottom of the inner chamber and this aperture is conveniently closable by a float whose weight differs in density between fuel and water so that accumulation of water will cause the float to move upward and close the aperture. The float is suitable rotatably secured to avoid lateral movements but provide vertical movement, and spinning movement so that materials initially adhering to it will be shaken off. If desired helical baffles or vanes may be disposed on the float to enhance the spin.

Figure 1:
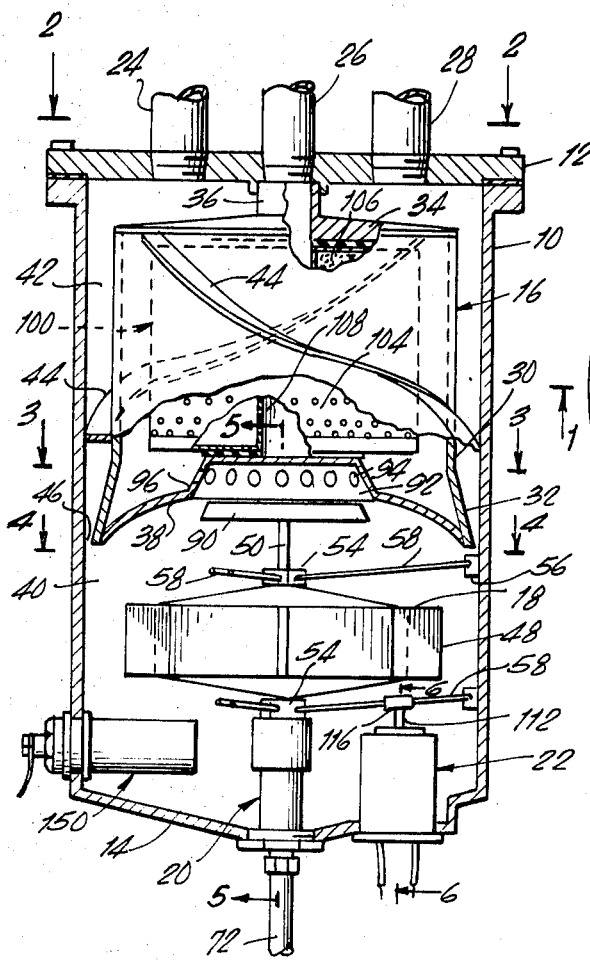
FIG. 1 is a sectional view through a liquid separator and filter unit embodying the present invention.
Figure 2:
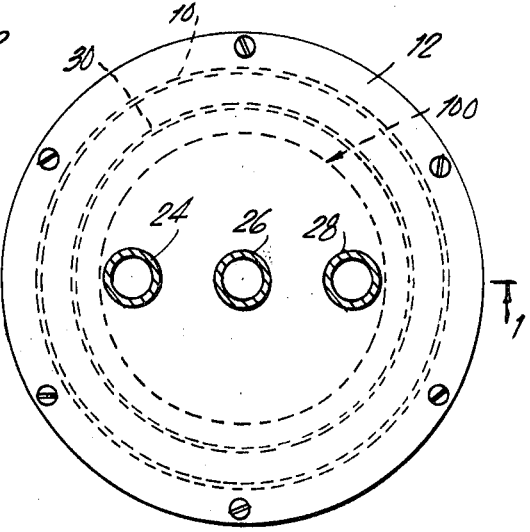
FIG. 2 is a plan view of the apparatus.
Figure 4:
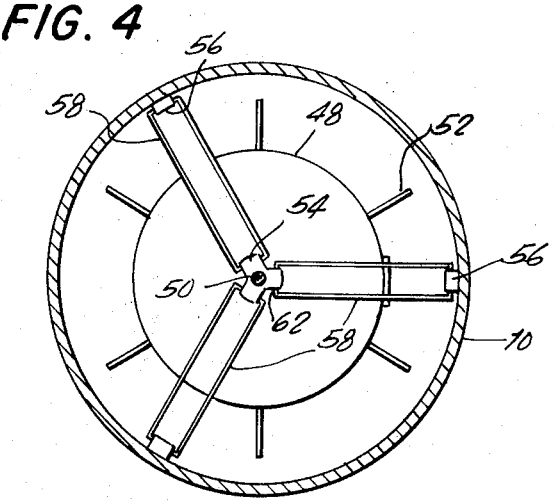
FIG. 4 is a sectional view taken on line 4–4 of FIG. 1.
Figure 3:
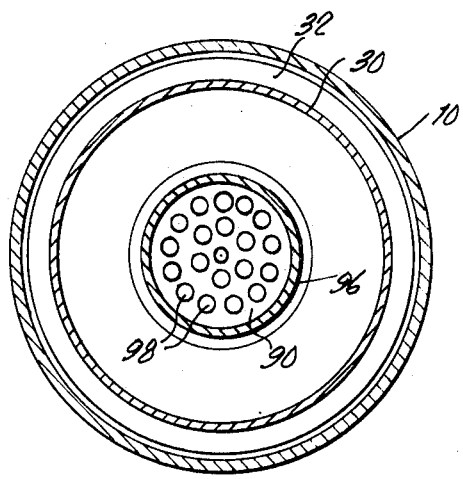
FIG. 3 is a sectional view taken on line 3–3 of FIG. 1.

Referring to the drawings and by way of illustration of a particular embodiment of my invention, my apparatus comprises a cylindrical container 10 having its upper end closed by a cover plate 12 and a generally conical lower end or bottom wall 14. Within the container 10 there is a filter chamber 16 within which a final filter or series of filters is disposed, a float 18, a discharge valve 20 and a warning switch 22. The cover plate 12 is provided with an inlet 24 for the fuel or other liquid to be treated, an outlet 26 from which cleaned fuel passes and an aperture 28 through which the unit may be flushed out as maintenance may require.

The filter chamber 16 within which a final filter or set of filters is disposed comprises a cylindrical inner container 30 suitably supported within container 10. If desired its lower portion 32 may be flared outwardly as shown in the drawings. The upper end of the container 32 is closed by a cover plate 34 having a tubular fitting 36 connected to the outlet 26. A generally horizontal valve plate 38 closes the lower end of the inner container 30 and separates the filter chamber 16 from the lower end of the container 10 which forms a reservoir 40 for water and other materials which are separated from the fuel. The final filter or filters can be any of various commercially available filters or filtering units.

The inner container 30 is supported within the outer container 10 in spaced relation thereto to define a narrow annular path 42 through which the fuel flows from the inlet 24 into the reservoir 40. One or more helical baffles or vanes 44 are disposed between the cylindrical walls of the containers 10 and 30 and cause the incoming fuel to swirl in a helical path through the space between the containers thereby subjecting the fuel to centrifugal force. Water and other foreign material having a density greater than that of the fuel is thus separated from the fuel. The flared lower end 32 of the filter chamber defines a relatively narrow discharge portion or space 46 leading into the reservoir 40 so that the liquid will have a relatively high velocity as it is discharged into the reservoir thereby causing the liquid within the reservoir to swirl or circulate within the reservoir so that the heavier constituents will flow outwardly due to centrifugal force where they will eventually settle to the bottom of the reservoir to be discharged from the unit through the discharge valve 20. The distance from the wall to flared end 32 is determined by the desired flow rate.

The float 18 has a density which is between that of water and the lighter fuel so that the float 18 will float on water that may accumulate in the lower end of the reservoir but will not float in the fuel. The float 18 comprises a hollow cylindrical float body 48 which is freely rotatable on a rod 50 and may be provided around its circumference with a series of vanes 52 so that the circular motion of the liquid within the reservoir may cause the float to rotate on rod 50, thereby tending to cause any dirt or foreign matter that might settle on the float to be thrown radially outwardly by centrifugal force to settle in the bottom of the reservoir.

Figure 5:
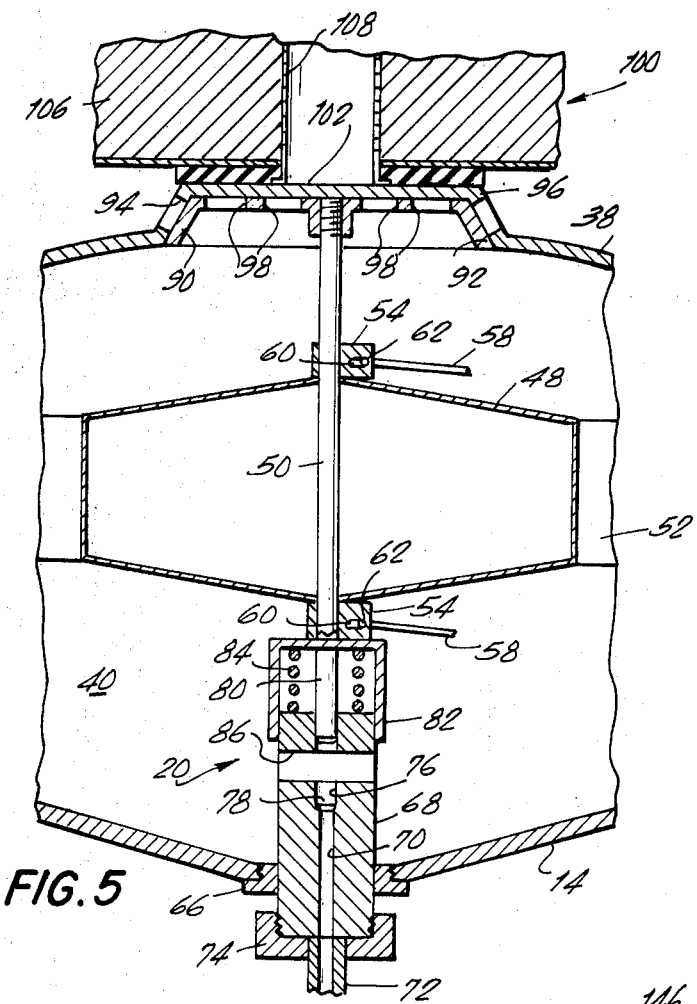
FIG. 5 is an enlarged fragmentary sectional view taken on line 5–5 of FIG. 1.

The float 18 is suspended within the reservoir by suitable means such as by a series of links of equal length in such manner as to minimize any tendency of the float to move in any but a vertical direction in relation to the container itself. Attaching lugs or terminals 54 are secured to rod 50 closely adjacent the top and bottom walls of the float 18, while the inner wall of the container 10 is provided with lugs 56 and links 58 are connected between the lugs 56 and terminals 54. Each of the links 58 may be made of small diameter wire or rod material and three of such links 58 may be provided both above and below the float 18. It is important that the links 58 all be of the same length and that all of such links have equal elastic properties and that all be disposed at the same angle to the vertical which is the direction of motion of the float 18. Referring to FIG. 5, it will be noted that the terminals 58 are provided with slots 60 within which the end portions 62 of the links are disposed so that the portions 62 of the links are free to move horizontally through the slots 60 as the float rises and falls within the reservoir. The links have a loose fit within the slots 60 to minimize the friction and to insure that the float will remain centered within the reservoir at all times and will have no tendency to wobble or move in any direction except a vertical direction. The outer ends of the links 58 extend through and are pivotally mounted within apertures in the lugs 56.

The bottom wall 14 of the container 10 is threaded to receive a drain plug 66 which supports the discharge valve 20. The discharge valve 20 includes a tubular fitting 68 having a central bore 70 extending through its lower end to connect with a discharge tube 72 supported within a cap 74 which is threaded on to the lower end of the fitting 68. The fitting 68 is provided with a larger diameter bore 76 to define a valve seat 78 engageable by a valve member 80 secured to the underside of a cap 82 which is slidably mounted on the upper end of the fitting 68. A spring 84 urges the cap 82 and the valve member 80 upwardly out of engagement with the valve seat 78 so as to open the discharge passage 70. The fitting 68 is provided with a transverse passage 86 which connects the bore 76 with the reservoir 40 so that water and foreign matter settled in the bottom of the reservoir 40 may be discharged through the passage 70 to the tube 72 when the valve member 80 is raised to open the passage 70.

The terminal 54 at the underside of the float 18 engages the cap 82 to force the latter downwardly against spring 84 to engage valve member 80 with valve seat 78 when the float 18 is in its lower position as it will be when no water is present in the bottom of the reservoir 40.

The upper end of the rod 50 has a valve member 90 threaded thereon, adjustable vertically to regulate the amount of fuel permitted to pass through, and engageable with a valve seat 92 formed on the plate 38 which separates the reservoir 40 from the filter chamber 16. The float 18 and the valve member 90 are shown in FIG. 1 in their lower positions in which fuel in the reservoir 40 is free to flow upwardly through apertures 94 in the raised conical portion 96 of the plate 38 which defines the valve seat 92. The valve member 90 is provided with a series of apertures 98 through which fuel may flow when the valve 90 is open. When the valve member 90 is raised sufficiently with the float 18 as water accumulates within the reservoir, the valve 90 will engage the valve seat 92 to close connection between the reservoir 40 and the filter chamber 16. The valve 90 is shown in its closed position in FIG. 5.

A filter or filters indicated generally at 100 is contained within the filter chamber 16 and rests upon the top wall 102 of the conical portion 96 of the valve plate 38. The filter 100 may be any commercially available type of final filter commonly used to filter fuel. The flow through the filter or filters 100 is inwardly through the perforated cylindrical wall 104 of the filter cartridge and through the filter material indicated at 106 which is generally made of paper or similar material and into a perforated central tube 108 from which the filtered fuel flows through the outlet fitting 36 and the outlet pipe 26. Any type of final filter or filters suitable for filtering fuel used can be employed.

Figure 6:
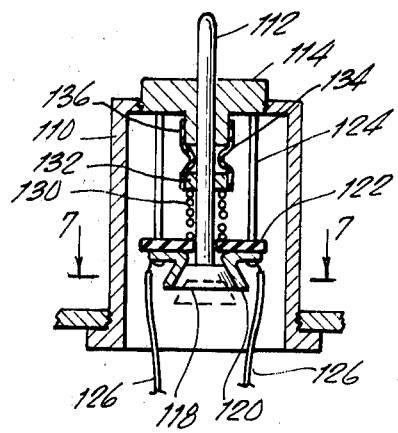
FIG. 6 is an enlarged sectional view taken on line 6–6 of FIG. 1.
Figure 7:
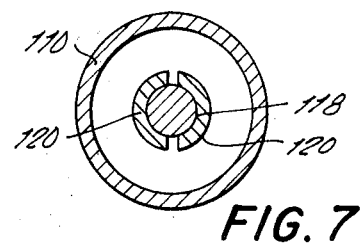
FIG. 7 is a sectional view taken on line 7–7 of FIG. 6.

When there is little or no water present in the fuel within the reservoir 40, the float will be in its lower position at which time the discharge valve 20 will be closed and shutoff valve 90 will be open as shown in FIG. 1. The incoming fuel will be subjected to centrifugal force in its passage through the annular path 42 into the reservoir 40 so that water and dirt particles in the fuel will be separated from the fuel and settle in the bottom of the reservoir. As the level of water rises in the reservoir 40, the float 18 will begin to rise and will first open the discharge valve 20 so that water will drain from the reservoir through the outlet 72. In the event that the water level rises further due either to unusually large amounts of water present in the fuel supply or to the clogging of the valve 20 with dirt accumulated in the bottom of the reservoir, the float 18 will continue to rise until the warning signal 22 is actuated. The warning device 22 comprises a casing member 110 threaded into the bottom wall of the reservoir and containing an electrical switch which includes a vertically reciprocal plunger 112 projecting upwardly through the closure plug 114 to engage the underside of a block 116 on one of the lower float supporting links 58. When the float is in its lower position, the head 118 of the plunger 112 will be in the dotted line position shown in FIG. 6 in which it is disengaged from the contact rings 120 which are secured to a plate 122 of nonconducting material which is suspended from the closure plug 114 by straps 124. The contact rings 122 each have a lead 126 electrically connected thereto which are connected to a warning light or an electrically operated audible signal to warn the operator that the level of water in the unit is dangerously high so that steps may be taken to drain the water from the unit by removing the drain plug 66 or to perform such other maintenance as may be required to prevent excessive contamination of the filter or filters or actual engine damage. If desired automatic engine shut-down can be accomplished such as by fuel starvation. A spring 130 is disposed between the plate 122 and a collar 132 secured on the plunger 112 to urge the plunger upwardly into engagement with the contact rings 120 to close the circuit through the warning device. A boot 134 of rubber or similar material is secure at its opposite ends to the collar 132 and the portion 136 of the closure plug 114. In order to prevent deterioration of the boot 134 by any fuel which might work through the opening in the plug 114 through which the plunger 112 extends, the space within the boot 114 may be filled with water or some other heavy liquid which is not harmful to rubber so that the fuel can not displace such liquid within the interior of the boot 134.

If the water level in the reservoir continues to rise after the warning signal 122 has been actuated, the valve 90 carried by the float 18 will finally engage the valve seat 92 to shut off either substantially all or completely the flow of fuel into the filter chamber 16, thereby reducing engine speed or shutting down the engine completely. It is possible in some installations that a complete shut down of the engine would be undesirable and for that reason as indicated above some fuel may be permitted to pass through by adjusting or modifying the closure valve 90.

Figure 8:
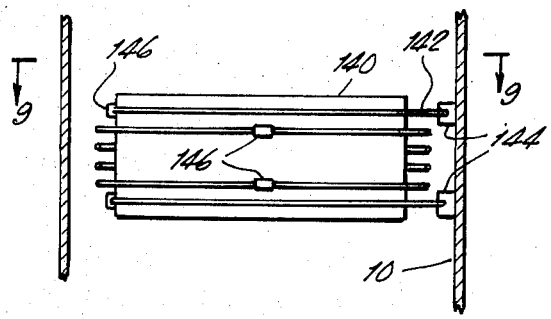
FIG. 8 is an elevational view of a modified form of suspension system for the float.
Figure 9:
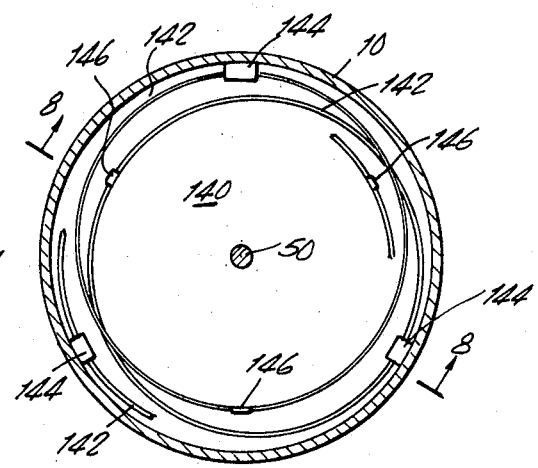
FIG. 9 is a sectional view taken on line 9–9 of FIG. 8.

FIGS. 8 and 9 disclose a modified form of the invention in which the float 140 is supported by a series of annular rings 142. Each of the rings 142 is pivotally connected at one point to a lug 144 secured to the inner wall of the container 10 and at a diametrically opposite point to a terminal 146 secured to the cylindrical wall of the float 140. The rings 142 may be arranged in pairs and three such pairs of rings may be used to support the float for vertical movement with no tendency to move laterally or to tilt even when the unit is subjected to sever vibrations or other movement. The rings 142 are made of spring steel or other resilient material and all of such rings are of equal resiliency between their points of attachment to the container and the float body. The float in this form of the invention of course does not rotate.

The unit may be provided if desired with an electrical resistance heater 150 contained within the casing threaded into the lower end of the reservoir so as to prevent freezing of any water that might be present in the reservoir to insure proper functioning of the float and the elements controlled thereby.

The separator and filter unit provided by this invention will effectively separate water and most other foreign materials from the fuel and automatically drain such material from the unit during normal operations so that the fuel that is supplied to the filter is sufficiently clean to enable use of the filter for extended periods of time without cleaning or replacement, as contrasted with systems presently used in which the filter requires very frequent servicing or replacement at considerable cost.

I claim:

1. An apparatus for separating and filtering a lighter liquid from a heavier liquid and other foreign materials which comprise a substantially cylindrical container, means for diving said container into an upper portion and a lower reservoir portion, liquid inlet and a filtered liquid outlet means in the upper portion of said container, outlet means in the reservoir portion for drawing said heavier liquid and foreign materials from said reservoir portion, means disposed within the upper portion of said container for imparting a centrifugal motion to the liquid flowing downward therethrough whereby lighter liquid separates from heavier liquid and other foreign materials, means for filtering said lighter liquid disposed within said upper portion of said container and means for preventing upward flow of the heavier liquid and other materials to the filtered liquid outlet.

2. An apparatus according to claim 1 wherein said dividing means comprises a substantially cylindrical container forming a chamber having a closable aperture through its bottom.

3. An apparatus according to claim 2 wherein said means for preventing upflow comprises a float having a density between those of the lighter and heavier liquids to be separated, means for resiliently supporting said float within said reservoir and means for discharging said heavier liquid and other foreign materials from the lower reservoir portion.

4. An apparatus according to claim 3 further comprising a warning device including a switch actuating device, a member operable to close the aperture into the chamber, means interengaging the float and the reservoir outlet means, the actuating device and the member whereby when the float is in its lower position the reservoir outlet is closed, the actuating device is open and the aperture is open, and as the level of the heavier liquid rises the float will rise thereby opening the reservoir outlet, causing the actuating device to close the switch setting off the warning device and closing the aperture in the chamber.

5. An apparatus according to claim 4 wherein said means for imparting centrifugal motion comprises helical baffles.

6. A liquid separator and filter unit comprising an outer cylindrical container having a liquid inlet and a filtered liquid outlet in its upper portion and a reservoir formed by its lower portion, a substantially cylindrical filter chamber for receiving filters disposed within the upper portion of said container in spaced relation thereto to define an annular path therebetween through which the liquid flows into said reservoir, said filter chamber having a bottom wall having an aperture therethrough separating said reservoir from the interior of said filter chamber, means disposed along said annular path to impart a circular motion to the liquid flowing through said path to subject the liquid to centrifugal force, thereby separating heavier liquid and solid constituents thereof and causing these to settle to the bottom of said reservoir, a drain outlet in the bottom of said reservoir through which said heavier constituents may be drained from said reservoir, the lighter constituents of the liquid flowing into said filter chamber, at least one filter unit disposed in said filter chamber through which the lighter liquid flows to said liquid outlet which is connected to said filter chamber, a float within said reservoir having a density between those of the lighter and heavier liquid constituents to be separated, means resiliently supporting said float within said reservoir, a discharge valve controlling flow through said drain outlet, a warning device including a switch actuating member disposed within said reservoir, a valve member operable to close said opening into said filter chamber, and means interengaging said float and said discharge valve, said switch actuating member and said valve member, whereby when said float is in its lower position said discharge valve is closed, the switch controlled by said actuating member is open and said valve member is open, and as the level of the heavier liquid constituent rises the float will rise to sequentially open said discharge valve, cause said actuating member to close said switch and move said valve member to a position closing said opening to said filter chamber.

7. A liquid separator and filter unit according to claim 6 wherein said means for supporting said float comprises a plurality of resilient links connected at their opposite ends to said float and said container.

8. A liquid separator and filter unit according to claim 7 wherein said links are pivotally connected at one end to the inner wall of said container and have their opposite ends slidably disposed within horizontal slots to allow angular movement of said links as said float rises and falls.

9. A liquid separator and filter unit according to claim 6 wherein said valve member is mounted on said float.

10. A liquid separator and filter unit according to claim 6 wherein the discharge valve is provided with a vertically reciprocable valve engageable with the underside of said float and spring means urging said valve to its open position.

11. A liquid separator and filter unit according to claim 7 wherein said switch actuating member comprises a vertically reciprocal plunger engageable with one of said links to open the switch when the float is in its lower position and a spring means urging said plunger upwardly to close the switch when said float rises to a predetermined level.

12. A liquid separator and filter unit according to claim 6 wherein said means for supporting said float comprises a series of resilient rings each connected at one point to said container and at a diametrically opposite point to said float.

PO-1050
(5/69)

UNITED STATES PATENT OFFICE
CERTIFICATE OF CORRECTION

Patent No. 3,568,835          Dated   March 9, 1971

Inventor(s)   Holger M. Hansen

It is certified that error appears in the above-identified paten and that said Letters Patent are hereby corrected as shown below:

Claim 1, Line 3:

"diving" should be --dividing--

Signed and sealed this 28th day of September 1971.

(SEAL)
Attest:

EDWARD M. FLETCHER, JR.            ROBERT GOTTSCHALK
Attesting Officer                  Acting Commissioner of Pat